United States Patent [19]

Speranza et al.

[11] Patent Number: 4,581,422

[45] Date of Patent: Apr. 8, 1986

[54] EPOXY RESIN COMPOSITION CONTAINING A CURING AGENT WHICH IS A REACTION PRODUCT OF CYANOGUANIDINE, FORMALDEHYDE AND AN AMINE

[75] Inventors: George P. Speranza; Harold G. Waddill, both of Austin, Tex.

[73] Assignee: Texaco, Inc., White Plains, N.Y.

[21] Appl. No.: 731,210

[22] Filed: May 6, 1985

[51] Int. Cl.$^4$ .................... C08G 59/56; C08G 59/64
[52] U.S. Cl. .................... 525/504; 525/510; 528/107; 528/111; 528/250
[58] Field of Search ............ 525/504, 510; 528/107, 528/111, 250

[56] References Cited

U.S. PATENT DOCUMENTS

| | | | |
|---|---|---|---|
| 3,553,166 | 1/1971 | Anderson et al. | 528/107 X |
| 3,728,302 | 4/1973 | Helm | 528/107 X |
| 3,963,667 | 6/1976 | Schreiber et al. | |
| 4,206,104 | 6/1980 | Dowbendo et al. | |
| 4,221,891 | 9/1980 | Erikson et al. | |
| 4,370,427 | 1/1983 | Schweitzer | 525/510 X |
| 4,490,510 | 12/1984 | Cummings | |
| 4,528,308 | 7/1985 | Waddill | 528/111 X |

OTHER PUBLICATIONS

"Epoxy Resin Technology, Developments Since 1979," Chemical Technology Review No. 204, pp. 81-83.

Primary Examiner—Earl Nielsen
Attorney, Agent, or Firm—Jack H. Park; Kenneth R. Priem

[57] ABSTRACT

The reaction product of cyanoguanidine, formaldehyde and an amine terminated polyether provides a liquid curing agent for epoxy resins. Epoxy resins are useful in applications such as decorative coatings, encapsulations, adhesives, laminates, potting compounds, etc.

8 Claims, No Drawings

EPOXY RESIN COMPOSITION CONTAINING A CURING AGENT WHICH IS A REACTION PRODUCT OF CYANOGUANIDINE, FORMALDEHYDE AND AN AMINE

BACKGROUND OF THE INVENTION

1. Field of the Invention

This invention relates to curable epoxy resins, and more particularly to epoxy resins cured with a reaction product of cyanoguanidine, amine and formaldehyde.

2. Related Publications

Cyanoguanidine is a widely used epoxy curing agent. However, it is a solid material and, therefore, difficult to use conveniently when curing liquid epoxy systems. Polyoxyalkylene amines and polyoxyalkylene polyamines are also known as epxoy curing agents. The use of cyanoguanidine (dicyandiamide) is disclosed in a technical report from American Hoechst Corporation entitled, "Dycyandiamide".

Polyoxyalkylene amines have been disclosed in many patents and publications as curing agents for epoxy resins. For example, U.S. Pat. Nos. 4,115,360; 4,141,885; 4,115,361; 4,146,700 and 4,169,177.

In the present invention it has been discovered that a reaction product of cyanoguanidine, formaldehyde and an amine, especially a polyoxyalkylene amine, provide, in most cases, a fluid, viscous liquid which is easily dispersed uniformly into epoxy resins thereby providing a new and useful epoxy resin curing agent and permits the use of cyanoguanidine in a much more usable form.

SUMMARY OF THE INVENTION

The invention is an epoxy resin composition comprising a vicinal polyepoxide having an epoxide equivalency of greater than about 1.8 and a curing amount of the reaction product of cyanoguanidine, formaldehyde and a primary or secondary amine, especially a polyoxyalkylene amine.

DESCRIPTION OF THE PREFERRED EMBODIMENTS

According to the instant inventive concept, a new epoxy resin curing composition is provided which is the reaction product of cyanoguanidine, formaldehyde and a primary or secondary amine. This reaction product is mixed in a curing amount with a vicinal polyepoxide having an epoxide equivalency of greater than about 1.8 to provide a cured epoxy material.

The epoxy resin curing agent is prepared from a reaction product of cyanoguanidine, formaldehyde and amines of the following description.

The amine terminated polyethers (polyoxyalkylene amines) useful in this invention are polyethers of about 350 molecular weight or more made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether.

In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50% of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined, for example, in U.S. Pat. No. 3,654,370 and other prior art techniques.

Polyoxyalkylene polyamines having the structure

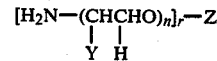

wherein Y is hydrogen, a methyl radical or an ethyl radical, Z is a hydrocarbon radical of 2–5 carbon atoms, n is a number sufficient to impart a molecular weight of about 350–2000 to the molecule and r is a number 2 or greater are useful.

Other useful amines include the JEFFAMINE® M-series which are mono functional amines represented by the general structure

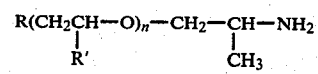

where R and R' are alkyl groups and n is a number of 1 or more.

Examples of useful amines of this type are as follows:
JEFFAMINE M-1000—CH$_3$O(C$_2$H$_4$O)$_{18.6}$[CH$_2$CH(CH$_3$)O]$_{1.6}$CH$_2$CH(CH$_3$)NH$_2$
JEFFAMINE M-600—CH$_3$OC$_2$H$_4$[CH$_2$CH(CH$_3$)O]$_8$CH$_2$CH(CH$_3$)NH$_2$
JEFFAMINE M-360—CH$_3$OC$_4$H$_9$(OCH$_2$CH$_2$)$_4$OCH$_2$CH(CH$_3$)OCH$_2$CH(CH$_3$)NH$_2$ Another example of a suitable amine to be used in accordance with the present invention is a polyoxyethylenediamine such as one having the formula

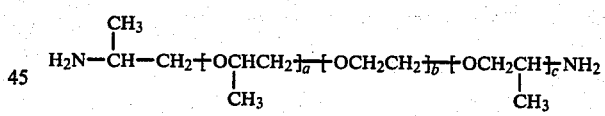

Examples of suitable polyoxyethylenediamines having this formula are as follows:

|  | Approximate Value | |
| --- | --- | --- |
|  | b | a + c |
| JEFFAMINE ED-600 | 13.5 | 3.5 |
| JEFFAMINE ED-900 | 20.5 | 3.5 |
| JEFFAMINE ED-2001 | 45.5 | 3.5 |

We believe the reaction to prepare the curing agents of this invention proceeds as follows:

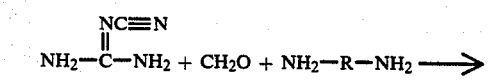

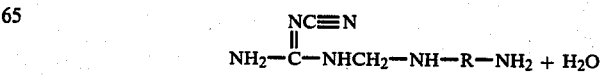

The reaction is preferably carried out at about 90° C. for about four hours. Thereafter the water of condensation and the water in any reactants is removed at about 90°–120° C. and pressures of about 10–50 mm. The preferred ratios are 1:1:1 for the reactants; however, an excess of the amine or cyanoguanidine may generally be used. With selected amines less than one mole may also be useful as the following examples will show.

The exact useful ratios for particular reactants are easily determined by one skilled in the art using the teachings herein. A satisfactory ratio should provide a product viscosity suitable for various applications such as molding, casting, encapsulating or spraying or brushing to form a coating.

Generally, the amine cured vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustration, but by no means exhaustive, lising of suitable dihydric phenols includes 4,4'-isopropylidene bisphenol, 2,4'-dihydroxydiphenylethylmethane, 3,3'-dihydroxydiphenyldiethylmethane, 3,4'dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, manniatol, sorbitol, erythritol, pentaerythritol, their dimers, trimers and higher polymers; e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolak resins can be obtained in Lee, H. and Neville, K., *Handbook of Epoxy Resins*, McGraw-Hill Book Co., New York, 1967.

Other polyepoxides known to those skilled in the art may be useful in this invention.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Many accelerators are known in the art which can be utilized in accordance with the instant invention. Examples include salts of phenols, salicyclic acids, amine salts of fatty acids, such as those disclosed in U.S. Pat. No. 2,681,901, and tertiary amines such as those disclosed in U.S. Pat. NO. 2,839,480. Preferred accelerators in accordance with the instant invention are disclosed in U.S. Pat. Nos. 3,875,072 and 4,195,153.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible; natural or synthetic resins can be added. Furthermore, although not preferred, known solvents for polyepoxide materials such as toluene, benzene, xylene, dioxane, ethylene glycol monomethyl ether and the like can be used. The compositions of the instant invention can be used as impregnants, surface coatings, encapsulating compositions, laminants and, particularly and most importantly, as adhesives for bonding metallic elements or structures permanently together.

The following examples illustrate the nature of the instant invention but are not intended to be limitative thereof.

EXAMPLE 1

Glass Transition Temperatures (Tg, °C.) of Epoxy Resins
Cured With Amine, Cyanoguanidine and Formaldehyde Condensates

| No. | Condensate Composition | Mole Ratio Condensate | Optimum Tg, °C. | Concentration[1] phr |
|---|---|---|---|---|
| 1 | JEFFAMINE ® D-400.Cyanoguanidine.CH$_2$O | 1:1:1 | 94.9 | 25 |
| 2 | JEFFAMINE T-403.Cyanoguanidine.CH$_2$O | 0.7:1:1 | 94.2 | 25 |

-continued

Glass Transition Temperatures (Tg, °C.) of Epoxy Resins
Cured With Amine, Cyanoguanidine and Formaldehyde Condensates

| No. | Condensate Composition | Mole Ratio Condensate | Optimum Tg, °C. | Concentration[1] phr |
|---|---|---|---|---|
| 3 | JEFFAMINE D-400.Cyanoguanidine.$CH_2O$ | 1:2:2 | 102.4 | 18 |
| 4 | JEFFAMINE D-230.Cyanoguanidine.$CH_2O$ | 1:1:1 | 112.1 | 16 |
| 5 | JEFFAMINE M-360.Cyanoguanidine.$CH_2O$ | 1:1:1 | 80.4 | 24 |
| 6 | JEFFAMINE M-360.Cyanoguanidine.$CH_2O$ | 0.67:1:1 | 89.2 | 22 |
| 7 | JEFFAMINE ED-600.Cyanoguanidine.$CH_2O$ | 1:2:2 | 96.4 | 24 |
| 8[2] | Dipropylenetriamine[3].Cyanoguanidine.$CH_2O$ | 1:1:1 | 132.9 | 16 |

[1]Concentration in parts per hundred of liquid epoxy resin of equivalent weight ~185.
[2]Comparative example. Not suitable.
[3]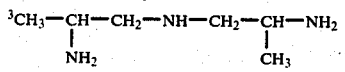

EXAMPLE 2

Storage Stability of Amine, Cyanoguanidine
and Formaldehyde Condensates After Combination
With a Liquid Epoxy Resin

| Formulation | A | B | C | D | E | F | G | H |
|---|---|---|---|---|---|---|---|---|
| EPON ® 828 | 100 | 100 | 100 | 100 | 100 | 100 | 100 | 100 |
| Condensate 1[1] | 25 | — | — | — | — | — | — | — |
| Condensate 2 | — | 25 | — | — | — | — | — | — |
| Condensate 3 | — | — | 18 | — | — | — | — | — |
| Condensate 4 | — | — | — | 16 | — | — | — | — |
| Condensate 5 | — | — | — | — | 24 | — | — | — |
| Condensate 6 | — | — | — | — | — | 22 | — | — |
| Condensate 7 | — | — | — | — | — | — | 24 | — |
| Condensate 8 | — | — | — | — | — | — | — | 16 |
| Storage Stability, days to solidify | | | | | | | | |
| @ 25° C. | 8 | <1 | 4 | 4 | >14 | <14 | 14[5] | 4 |
| @ 40° C. | 4 | <1 | 4 | 4 | 10 | 9 | 6[2,3] | 4 |

[1]From Example 1.
[2]Liquid after 48 hours but gel particles formed throughout.
[3]Near gel after 5 days; phase separation of gel-liquid.
[4]Non-homogeneous after mixing; gel-like particles in liquid.
[5]Near gel; non-homogeneous.

EXAMPLE 3

This experiment will describe the technique used to make the runs described in Table I. To a 500 ml three-necked flask equipped with a stirrer, thermometer and Dean-Stark trap was added 43 g (0.5 moles) of cyanoguanidine and 200 g of JEFFAMINE D-400 amine (0.5 moles). With stirring and under nitrogen, the mixture was heated to 50° C. The mixture has a turbid appearance and was cooled to 25° C. Then 40.5 g of formalin (37% formaldehyde; 0.5 moles) was added over a 15-minute period. The reactants were heated to 90° C. and held at 90°-110° C. for three hours. About 8 ml of water was collected. Finally, the product was heated for two hours at 90° C. and 20 mm pressure. The product was a viscous almost colorless liquid.

TABLE I

Reactions of Cyanoguanidine, Formalin and Amines

| No. | Cyanoguanidine Grams | Cyanoguanidine Moles | 37% Formalin Grams | 37% Formalin Moles | JEFFAMINE ® or Amine | Grams | Moles | Product Weight, g |
|---|---|---|---|---|---|---|---|---|
| 1 | 43 | 0.5 | 40.5 | 0.5 | D-400 | 200 | 0.5 | 248 |
| 2 | 8.4 | 0.1 | 8.1 | 0.1 | ED-900 | 90 | 0.1 | 99.0 |
| 3 | 8.4 | 0.1 | 8.1 | 0.1 | T-5000 | 680 | 0.272 | 681.5 |
| 4 | 42 | 0.5 | 42 | 0.5 | T-403 | 139.5 | 0.35 | 325 |
| 5 | 16.8 | 0.2 | 16.8 | 0.2 | DPTA | 25.4 | 0.2 | 42.2 |
| 6 | 8.4 | 0.1 | 8.1 | 0.1 | D-2000 | 200 | 0.1 | 208.3 |
| 7 | 33.6 | 0.4 | 32.4 | 0.4 | D-400 | 80 | 0.2 | 117.5 |
| 8 | 16.8 | 0.2 | 16.2 | 0.2 | D-2000 | 400 | 0.2 | 457.6 |
| 9 | 33.6 | 0.4 | 32.4 | 0.4 | D-230 | 72 | 0.4 | 126.8 |
| 10 | 42 | 0.5 | 41 | 0.5 | D-230 | 57.5 | 0.25 | 104.2 |
| 11 | 43 | 0.5 | 41 | 0.5 | M-360 | 180 | 0.5 | 227.0 |
| 12 | 42 | 0.5 | 41 | 0.5 | M-360 | 120 | 0.33 | 167.6 |
| 13 | 42 | 0.5 | 41 | 0.5 | ED-600 | 150 | 0.25 | 197.7 |
| 14 | 102 | 1.2 | 97.2 | 1.2 | D-400 | 240 | 0.6 | 355.4 |
| 15 | 33.6 | 0.4 | 32.4 | 0.4 | D-230 | 72 | 0.4 | 107.5 |
| 16 | 42 | 0.5 | 41 | 0.5 | N—butyl amine | 37 | 0.5 | — |
| 17 | 84 | 1.0 | 81 | 1.0 | Methoxy- | 89 | 1.0 | 163 |

TABLE I-continued

Reactions of Cyanoguanidine, Formalin and Amines

| No. | Cyanoguanidine Grams | Cyanoguanidine Moles | 37% Formalin Grams | 37% Formalin Moles | JEFFAMINE ® or Amine | Grams/Moles | Product Weight, g |
|---|---|---|---|---|---|---|---|
| | | | | | propylamine | | |

Product Appearance
[1] Viscous, almost colorless liquid
[2] Nice fluid, light yellow liquid
[3] Homogeneous white dispersion
[4] Viscous, light colored material
[5] Reddish orange color, non-pourable
[6] Creamy-turbid
[7] Very viscous yellow liquid
[8] Cream colored, slightly viscous
[9] Gold colored clear liquid
[10] Amber colored, slightly turbid solid
[11] Clear amber liquid at room temp.
[12] Light yellow, slightly turbid and
[13] Light yellow with slight haze to product. Water soluble, slightly pourable at room temperature
[14] Light yellow slightly turbid solid at room temperature
[15] Light yellow, slightly hazy solid at room temperature
[16] Solid gel, light yellow and taffy-like when warm
[17] White, brittle solid

EXAMPLE 4

According to the general procedure of Example 3, the following epoxy resins were mixed with curatives and a casting was made where possible.

| | A | B | C | D |
|---|---|---|---|---|
| Formulation | | | | |
| Liquid epoxy resin (EEW ~ 185) | 100 | 100 | 100 | 100 |
| JEFFAMINE D-400.DICY.CH$_2$O Cond. (0.5.0.5.0.5 molar) | 25 | — | — | — |
| JEFFAMINE T-403.DICY.CH$_2$O Cond. (0.5.0.5.0.5 molar) | — | 25 | — | — |
| JEFFAMINE D-400.DICY.CH$_2$O Cond. (1.0.2.0.0.2.0 molar) | — | — | 18 | — |
| JEFFAMINE D-230.DICY.CH$_2$O Cond. | — | — | — | 16 |
| Storage stability, days to solidify | | | | |
| @~25° C. | 8[3] | <1[4] | 5 | 5 |
| @40° C. | 4[3] | <1[4] | 5 | 5 |
| | | | 6 | 7 |
| Properties of Cured ⅛ in Castings[1] | | | | |
| Izod impact strength, ft/lbs/in | 0.12 | 0.14 | | |
| Tensile strength, psi | 10450 | 10600 | | |
| Tensile modulus, psi | 449000 | 473000 | | |
| Elongation at break, % | 5.2 | 6.5 | | |
| Flexural strength, psi | 17950 | 16600 | | |
| Flexural modulus, psi | 482000 | 448000 | | |
| HDT, °C., 264 psi/66 psi | 63/72 | 86/91 | | |
| Shore D hardness, 0–10 sec | 77–74 | 76–74 | | |
| Compression strength at yield, psi | 12400 | 13500 | — | |
| at failure, psi | 42400 | 40100 | 6100 | |
| % weight gain, 24 hour water boil | 5.0 | 3.5 | | |
| % weight gain, 3 hour acetone boil | 10.5 | 7.0 | | |
| Adhesive Properties[2] | | | | |
| Tensile shear strength, psi | 4000 | 3400 | 3900 | |
| T-peel strength, pli | 3.3 | 2.7 | 2.4 | |

[1] Cured 2 hrs at 100° C., 3 hrs at 150° C.
[2] Cured 1 hr at 150° C., 3 hrs at 150° C.
[3] Viscous after 24 hours.
[4] Brittle solid after 24 hours.
[5] Non-homogeneous-solids in liquid immediately after mixing.
[6] Could not prepare satisfactory panel for testing.
[7] Viscous gel formed on mixing; could not pour into mold.

EXAMPLE 5

As in Example 4, additional formulations were made into castings where possible.

| | E | F | G | H |
|---|---|---|---|---|
| Formulation | | | | |
| Liquid epoxy resin (EEW ~ 185) | 100 | 100 | 100 | 100 |
| JEFFAMINE M-360.DICY.CH$_2$O Cond. (1.0.1.0.1.0 molar) | 24 | — | — | — |
| JEFFAMINE M-360.DICY.CH$_2$O Cond. (0.67.1.0.1.0 molar) | — | 22 | — | — |
| JEFFAMINE ED-600.DICY.CH$_2$O Cond. (0.5.1.0.1.0 molar) | — | — | 24 | — |
| DPTA[1].DICY.CH$_2$O Cond. | — | — | — | 16 |
| Storage stability, days to solidify | | | | |
| @~25° C. | ~30 | ~30 | ~21 | 6 |
| @40° C. | 10 | 9 | 6[4,5] | 6 |
| Properties of Cured ⅛ in Castings[2] | | | | |
| Izod impact strength, ft/lbs/in | 0.12 | 0.14 | 0.14 | |
| Tensile strength, psi | 8100 | 8600 | 10000 | |
| Tensile modulus, psi | 472000 | 470000 | 471000 | |
| Elongation at break, % | 2.4 | 2.1 | 4.0 | |
| Flexural strength, psi | 14300 | 16400 | 17200 | |
| Flexural modulus, psi | 432000 | 471000 | 493000 | |
| HDT, °C., 264 psi/66 psi | 42.5/44 | 51/57 | 47/51 | |
| Shore D hardness, 0–10 sec | 75–71 | 77–74 | 75–72 | |
| Compression strength at yield, psi | 12000 | 13700 | 12700 | |
| to failure, psi | 30700 | 28500 | 26800 | |
| % weight gain, 24 hour water boil | 5.0 | 5.0 | — | |
| % weight gain, 3 hour acetone boil | 28.9 | 16.5 | — | |
| Adhesive Properties[3] | | | | |
| Tensile shear strength, psi | 1600 | 3600 | 3800 | |
| T-peel strength, pli | 1.5 | 1.9 | 2.7 | |

[1] DPTA = dipropylenetriamine. Comparative example.
[2] Cured 2 hrs at 100° C., 3 hrs at 150° C.
[3] Cured 1 hr at 100° C., 3 hrs at 150° C.
[4] Liquid after 48 hrs but gel particles formed throughout liquid material.
[5] Near gel after 5 days; phase separation of gel particles.
[6] Gel-like particles formed immediately on mixing; no panel prepared.

GLOSSARY

JEFFAMINE ® D-400—a polyoxyalkylene diamine of about 400 molecular weight. A product of Texaco Chemical Co.

JEFFAMINE T-403—a polyoxyalkylene triamine of about 400 molecular weight. A product of Texaco Chemical Co.

JEFFAMINE D-230—a polyoxyalkylene diamine of about 230 molecular weight. A product of Texaco Chemical Co.

JEFFAMINE M-360—a polyoxyalkylene monoamine of about 360 molecular weight. A product of Texaco Chemical Co.

JEFFAMINE ED-600—a water soluble polyoxyalkylene diamine of about 600 molecular weight. A product of Texaco Chemical Co.

EPON® 828—liquid epoxy resin—a diglycidyl ether of Bisphenol A of EEW ~185. EEW is epoxy equivalent weight.

JEFFAMINE T-5000—a polyoxyalkylene triamine of about 5000 molecular weight. A product of Texaco Chemical Co.

JEFFAMINE ED-900—a water soluble polyoxyalkylene diamine of about 900 molecular weight. A product of Texaco Chemical Co.

JEFFAMINE D-2000—a polyoxyalkylene diamine of about 2000 molecular weight. A product of Texaco Chemical Co.

We claim:

1. An epoxy resin composition comprising
   a. a vicinal polyepoxide having an epoxide equivalency of greater than about 1.8, and
   b. a curing amount of the reaction product of cyanoguanidine, formaldehyde and an amine terminated polyether.

2. An epoxy resin composition comprising
   a. a vicinal polyepoxide having an epoxide equivalency of greater than about 1.8, and
   b. a curing amount of the reaction product of cyanoguanidine, formaldehyde and a monoamine terminated polyether.

3. An epoxy resin composition comprising
   a. a vicinal polyepoxide having an epoxide equivalency of greater than about 1.8, and
   b. a curing amount of the reaction product of cyanoguanidine, formaldehyde and a diamine terminated polyether.

4. An epoxy resin composition comprising
   a. a vicinal polyepoxide havng an epoxide equivalency of greater than about 1.8, and
   b. a curing amount of the reaction product of cyanoguanidine, formaldehyde and a triamine terminated polyether.

5. In a method for curing a vicinal polyepoxide having an epoxide equivalency of greater than about 1.8 wherein an effective amount of acuring agent is intimately mixed with the vicinal polyepoxide under epoxy resin curing conditions, the improvement which comprises using as the curing agent the reaction product of cyanoguanidine, formaldehyde and an amine terminated polyether.

6. In a method for curing a vicinal polyepoxide having an epoxide equivalency of greater than about 1.8 wherein an effective amount of a curing agent is intimately mixed with the vincinal polyepoxide under epoxy resin curing conditions, the improvement which comprises using as the curing agent the reaction product of cyanoguanidine, formaldehyde and a monoamine terminated polyether.

7. In a method for curing a vicinal polyepoxide having an epoxide equivalency of greater than about 1.8 wherein an effective amount of a curing agent is intimately mixed with the vincinal polyepoxide under epoxy resin curing conditions, the improvement which comprises using as the curing agent the reaction product of cyanoguanidine, formaldehyde and a diamine terminated polyether.

8. In a method for curing a vicinal polyepoxide having an epoxide equivalency of greater than about 1.8 wherein an effective amount of a curing agent is intimately mixed with the vicinal polyepoxide under epoxy resin curing conditions, the improvement which comprises using as the curing agent the reaction product of cyanoguanidine, formaldehyde and a triamine terminated polyether.

* * * * *